Mar. 6, 1923.
S. B. HENSHAW
METHOD AND APPARATUS FOR FLATTENING SHEET GLASS
Filed Aug. 28, 1920
1,447,661
2 sheets-sheet 2
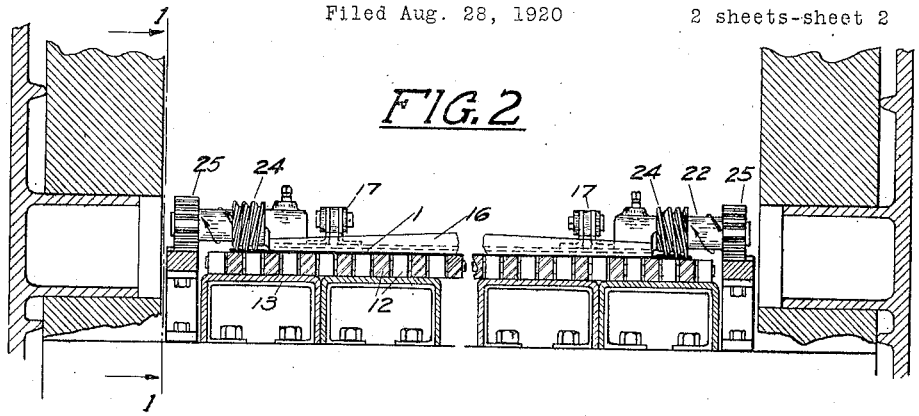
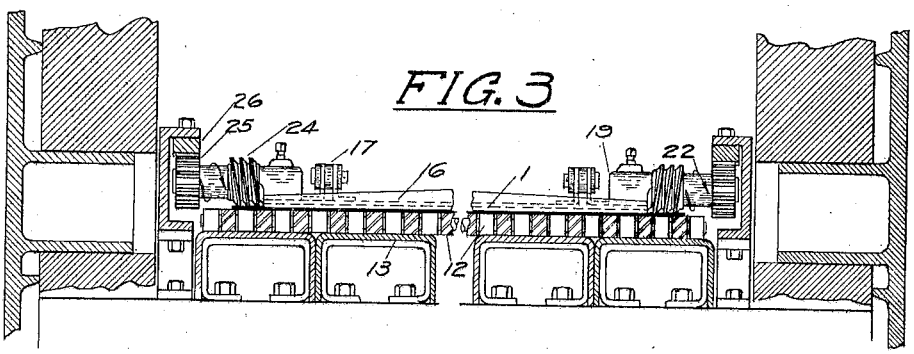
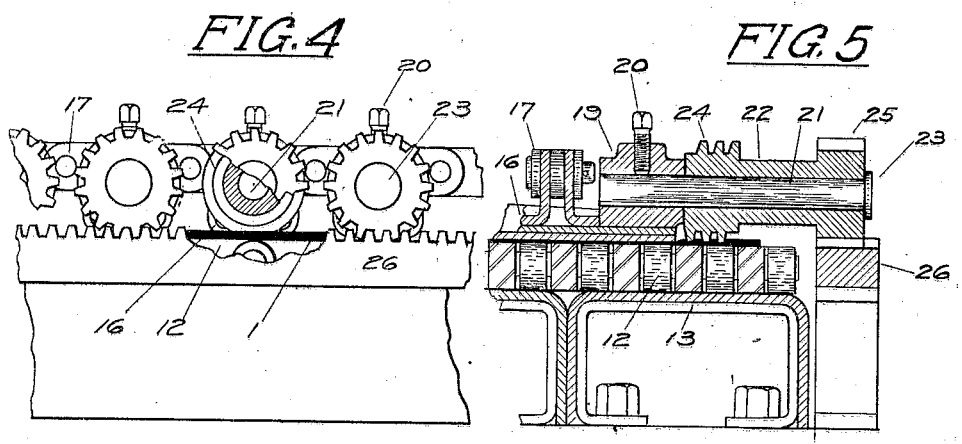
Inventor
SETH B. HENSHAW
By C. A. Rowley
Attorney Patented Mar. 6, 1923.

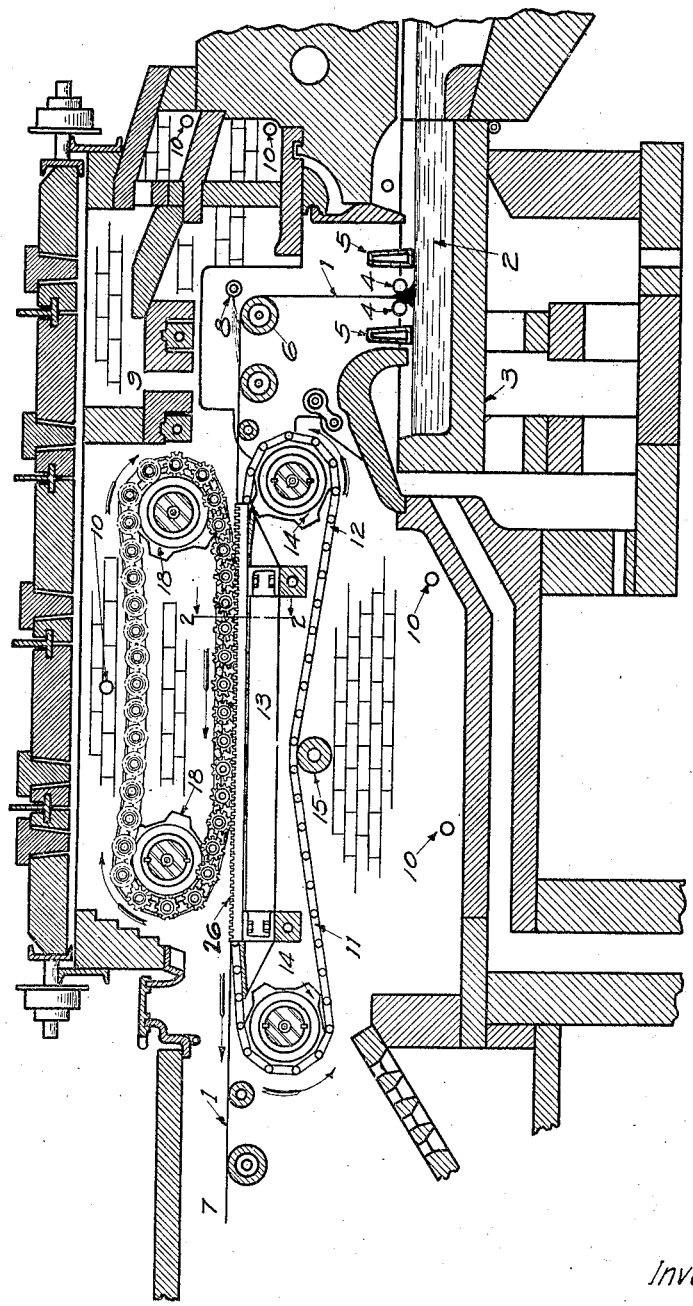

1,447,661

UNITED STATES PATENT OFFICE.

SETH B. HENSHAW, OF CHARLESTON, WEST VIRGINIA, ASSIGNOR TO THE LIBBEY-OWENS SHEET GLASS COMPANY, OF TOLEDO, OHIO, A CORPORATION OF OHIO.

METHOD AND APPARATUS FOR FLATTENING SHEET GLASS.

Application filed August 28, 1920. Serial No. 406,577.

*To all whom it may concern:*

Be it known that I, SETH B. HENSHAW, a citizen of the United States, residing at Charleston, in the county of Kanawha and State of West Virginia, have invented new and useful Improvements in Methods and Apparatus for Flattening Sheet Glass, of which the following is a specification.

This invention relates to the art of drawing glass in sheet form from a molten mass of glass, and is concerned more particularly with a process and apparatus for stretching the drawn sheet laterally to flatten the same and improve its quality.

The invention as here shown is in the nature of an improvement or addition to the apparatus shown in the patents to I. W. Colburn, 1,248,809, dated Dec. 4, 1917, and 1,274,385, dated Aug. 6, 1918. In this patented apparatus, a sheet of glass is drawn upwardly from a bath of molten glass, bent into a horizontal plane, reheated, and then passes through a drawing mechanism which gives the required longitudinal pull to produce the continuous sheet of glass, and at the same time flattens the reheated and softened sheet into its final form. In carrying out this present invention, a series of worms are mounted at the sides of the drawing mechanism, to engage the edge portions of the drawn sheet and exert an additional sidewise or lateral stretch to the sheet.

The nature and objects of this invention will become more apparent as the detailed description proceeds.

Referring to the accompanying drawings:

Fig. 1 is a longitudinal vertical section through a portion of the glass drawing mechanism, substantially on the plane indicated by the line 1—1 of Fig. 2, the drawing devices forming the subject-matter of this invention being shown in side elevation.

Fig. 2 is a partial transverse vertical section through the draw mechanism, taken on the line 2—2 of Fig. 1, the central portion being broken away so that the full width of the sheet is not illustrated.

Fig. 3 is a view similar to Fig. 2 showing another modification of the invention.

Fig. 4 is a fragmental side elevation of the side stretching devices on an enlarged scale, parts of one of the gears and the rack being broken away to show the engagement of the worm with the glass sheet.

Fig. 5 is a central longitudinal vertical section through one of the stretching devices and parts of the adjacent drawing mechanism, on an enlarged scale.

Referring to Fig. 1, the glass sheet 1 is drawn up from glass bath 2 in receptacle 3, between edge forming rollers 4 and cooling devices 5, then bent horizontally over cooled bending roll 6, and then passes off horizontally through the drawing mechanism and into the annealing leer 7 all as shown and described more particularly in Patent 1,248,809, above noted. After leaving the bending roll 6, the sheet is reheated and softened by means of the burners 8, and heat passing down from the overhanging chamber 9, and the temperature of the sheet and of the various parts of the apparatus, is regulated by suitably arranged burners some of which are illustrated by way of example at the various points 10. The mechanism for applying the necessary longitudinal draft to the sheet is of substantially the form set forth in Colburn Patent, 1,274,385, referred to above. It comprises a suitable carrier or draw-table 11, in the form of an endless flexible chain of closely intermeshing links 12. The table is somewhat wider than the drawn sheet, as shown in Fig. 2, and is supported throughout its upper horizontal run by the stationary flexible drawing-table 13. The table is carried at the ends, and driven by, sprockets 14, and the lower return run of the loop is supported by the idler roll 15. Above the sheet is arranged an endless series of clamping or draw-bars 16, connected by sprocket chains 17, supported and driven by sprockets 18. These draw-bars 16 are U-shaped in cross-section, and preferably bear on the glass sheet adjacent their ends only, the sheet thus being gripped at its edges between the synchronously moving draw-table and draw-bars, whereby continuous longitudinal movement is imparted thereto. At the same time the reheated and softened sheet is flattened out upon the smooth upper surface of the draw-table. All of the above is substantially the same as set forth in the prior Colburn patents referred to above.

The present invention provides an additional means cooperating with the above mechanism, to give a lateral stretch to the glass sheet while on the draw-table, thus securing a flatter and more uniform sheet. At each end of each draw-bar, an upwardly extending bracket 19 is mounted in the trough of the U-shaped bar, and in each bracket is secured, by set-screw 20, a short outwardly extending shaft or trunnion 21. On this shaft is rotatably mounted a sleeve member 22, held between the bracket 19 at one end and a flange 23 on the shaft, at the other end. On the inner enlarged end of this sleeve is cut a worm, or screw thread 24, while at its outer end is formed a spur or pinion 25. The worm and gear may either or both be formed separately and keyed to the shaft, if desired, and the worms and gears may be either cut or cast as found expedient. In the form shown in Figs. 1, 2, 4 and 5, racks 26 are mounted, beyond the edges of the draw-table, and are here shown as carried by the supports for the stationary table 13.

In operation the draw-table and draw-bars are synchronously driven in the direction of the arrows in Fig. 1, and away from the observer in Fig. 2, gripping and carrying the glass sheet along between them. As the draw-bars turn into their lower run, the gears 25 engage with the stationary racks 26 and are rotated in the direction of the arrows, Fig. 2. The worms 24, which have engaged with the somewhat softened thick edge-portions of the glass sheet, are also rotated by means of the connecting sleeves 22, and exert a screwing action on the sheet, tending to draw the edges of the sheet outwardly. There being one of these worms on the end of each draw-bar, all exerting a similar stretching action on the sheet, there is a tendency to stretch the sheet laterally over the entire area engaged by the draw-bars and draw-table. This aids to obtain a flatter sheet, and also tends to draw out wrinkles and waves which may be present in the drawn sheet.

In Fig. 3 is shown a slight modification of the apparatus, wherein the racks 26 are placed above the pinions 25, instead of below as shown in the previously described modification. The racks are mounted in any suitable manner at the sides of the draw mechanism, and it would be preferable to have yielding supports (not shown), for these racks, to allow for inequalities in the thickness of the sheet. In this form of the invention, the pinions, sleeves and worms will obviously be rotated in the opposite direction from those shown in Fig. 2, and the worm which has a left-hand thread in Fig. 2 will have a right-hand thread in Fig. 3 and vice-versa, to produce the required stretching action on the sheet. The particular advantage of this form of the invention, lies in the fact that the worms are rotating in the same direction that the sheet is being drawn and will thus tend to assist in the drawing action, as well as to stretch the sheet laterally.

It is apparent that the stretching device here shown, would be equally effective if used with a vertical sheet drawing apparatus, also that many changes in the form and details of the several features of the apparatus would be possible without departing from the scope of the invention as specified in the following claims.

Claims:

1. The method of drawing sheet glass consisting in drawing a sheet from a tank of molten glass, re-heating the sheet after it is partially set, stretching the reheated sheet laterally without interrupting its longitudinal travel, and annealing the sheet.

2. The method of drawing sheet glass, consisting in drawing a sheet upwardly from a tank of molten glass, bending the sheet to the horizontal, re-heating the sheet in its initial horizontal run, stretching the reheated sheet laterally without interrupting its longitudinal travel, and annealing the sheet.

3. The method of drawing and flattening sheet glass, consisting in drawing a sheet upwardly from a mass of molten glass, bending the sheet into a horizontal plane, reheating the sheet and simultaneously supporting the softened sheet and drawing it longitudinally and stretching it laterally.

4. In a sheet glass drawing apparatus, means moving bodily longitudinally with the sheet upon which the drawn sheet is supported, and means also traveling with the sheet and the first means, and cooperating with the first means to pull the sheet both longitudinally and laterally.

5. In a sheet glass drawing apparatus, draw-members gripping the opposite faces of the edges of the sheet and moving bodily therewith to pull the sheet longitudinally, and devices carried by the draw-members for simultaneously stretching the sheet laterally.

6. In an apparatus for drawing continuous sheet glass, wherein the glass sheet is drawn vertically from a receptacle containing molten glass, bent into the horizontal plane, and then reheated to soften and flatten the same, a drawing mechanism comprising, an endless carrier or draw-table, an endless series of clamping members gripping the edges of the sheet against the table, comprising revoluble devices carried by the ends of the clamping members for engaging the sheet edges and stretching the softened sheet laterally.

7. In an apparatus for drawing continuous sheet glass, a receptacle containing molten glass, and means for drawing a sheet therefrom comprising, an endless carrier or supporting table, an endless series of draw-bars, the carrier and draw-bars moving synchronously at opposite faces of the sheet, and a series of devices carried at the ends of the draw-bars for engaging the sheet edges and pulling them outwardly to stretch and flatten the sheet.

8. In an apparatus for drawing sheet glass, drawing mechanism for gripping the sheet edges and drawing the sheet longitudinally, comprising endless looped members which travel longitudinally in the plane of the sheet while in engagement therewith, and stretching devices carried by one of the endless members for applying lateral pull to the sheet.

9. In an apparatus for drawing continuous sheet glass, wherein a sheet of glass is drawn from a mass of molten glass, mechanism for drawing the sheet and stretching it laterally comprising, an endless carrier or draw-table for supporting the sheet, an endless series of draw-bars traveling in unison with the draw-table at the opposite face of the sheet, a series of worm-gears, loosely pivoted at the ends of the draw-bars, a spur pinion secured to and rotating with each worm, and stationary racks engaged by the pinions while the worms are engaging the edge-portions of the plastic sheet, the racks enforcing rotation of the pinions and worms relative to the sheet, thus pulling the sheet edge outwardly.

10. In an apparatus for drawing continuous sheet glass, a receptacle containing molten glass, and means for drawing a sheet of glass therefrom, comprising, an endless carrier or draw-table for supporting one face of the sheet, an endless series of draw-bars, the table and draw-bars moving in unison at opposite faces of the sheet, a short stationary shaft or trunnion at the end of each draw-bar, a sleeve member freely rotatable on each trunnion, each sleeve having a spur pinion at its outer end and a worm-gear at its inner end, and a stationary rack at each side of the path of travel of the table and draw-bars, the pinions engaging with the racks and being rotated thereby while the worms engage the edge portions of the glass sheet and tend to draw the same laterally, thus stretching and flattening the sheet.

11. In an apparatus for drawing continuous sheet glass, wherein a sheet of glass is drawn vertically from a mass of molten glass, bent into a horizontal plane and then reheated, mechanism for drawing the sheet longitudinally and stretching it laterally comprising, an endless carrier or draw-table for supporting one face of the sheet, an endless series of draw-bars the table and draw-bars moving in unison at opposite faces of the sheet, a short stationary shaft or trunnion at each end of each draw-bar, a sleeve member freely rotatable on each trunnion, each sleeve having a spur pinion at its outer end and a worm gear at its inner end, and a stationary rack alongside the path of travel of the draw-bars, the pinions engaging with the tracks and being rotated thereby while the worms are engaging the edge portions of the glass sheet and pulling the same outwardly.

12. The method of drawing and flattening continuous sheet glass, which consists in gripping the opposite edge portions of the sheet and carrying the sheet longitudinally upon a plane flattening surface moving with the sheet, and simultaneously pulling the gripped portions laterally of the sheet to stretch the sheet laterally while on the flattening surface.

Signed at Charleston, in the county of Kanawha and State of West Virginia, this 20th day of August, 1920.

SETH B. HENSHAW.